United States Patent [19]
Bullinger

[11] 3,848,508
[45] Nov. 19, 1974

[54] INFANTRY ATTACK VEHICLE WITH RESILIENT ARMOR

[76] Inventor: David John Bullinger, Cayuta Rd., Van Etten, N.Y. 14889

[22] Filed: June 7, 1973

[21] Appl. No.: 367,704

[52] U.S. Cl............... 89/36 H, 89/1.815, 109/49.5, 109/81, 180/9.38
[51] Int. Cl............................................. F41h 7/04
[58] Field of Search ....... 2/2.5; 42/94; 89/1 A, 1 M, 89/1.815, 1.816, 36 R, 36 A, 36 C, 36 D, 36 E, 36 F, 36 G, 36 H, 36 Z, 36 J, 37 B, 37 BA, 40 B, 40 C; 102/62; 109/49.5, 78, 80, 81, 85; 114/9-14, 221 A; 180/6.7, 9.24 RA, 9.38

[56] References Cited
UNITED STATES PATENTS

| 41,126 | 1/1864 | Sholl | 114/221 A |
|---|---|---|---|
| 1,203,962 | 11/1916 | Bellamore | 89/36 F |
| 2,318,147 | 5/1943 | Ericson | 89/36 F |
| 2,377,838 | 6/1945 | Collings | 89/40 B |
| 2,399,691 | 5/1946 | Partiot | 109/85 |
| 2,913,960 | 11/1959 | Harvey et al. | 89/1.815 |
| 3,623,563 | 11/1971 | Gostomski | 180/9.38 |

OTHER PUBLICATIONS
Popular Science, Dec. 1936, front cover and p. 45.

Primary Examiner—Stephen C. Bentley

[57] ABSTRACT

An infantry attack vehicle having a propelling motor, a transmission and a flexable endless track similar to the conventional snowmobile. A rubber tired front wheel or wheels for stearing the vehicle, a cushion to accomodate two infantrymen, a removable supply and ammunition container, a towing cable with two hooks, one for towing the other for removing wire entanglement. A trailer hitch for pulling a supply trailer and for transporting casualties to the hospital copter. Resilient armor around the front portion of the vehicle, and a removable side panel of resilient armor that can be shifted to either side of the vehicle depending on which side is exposed to the enemy.

4 Claims, 7 Drawing Figures

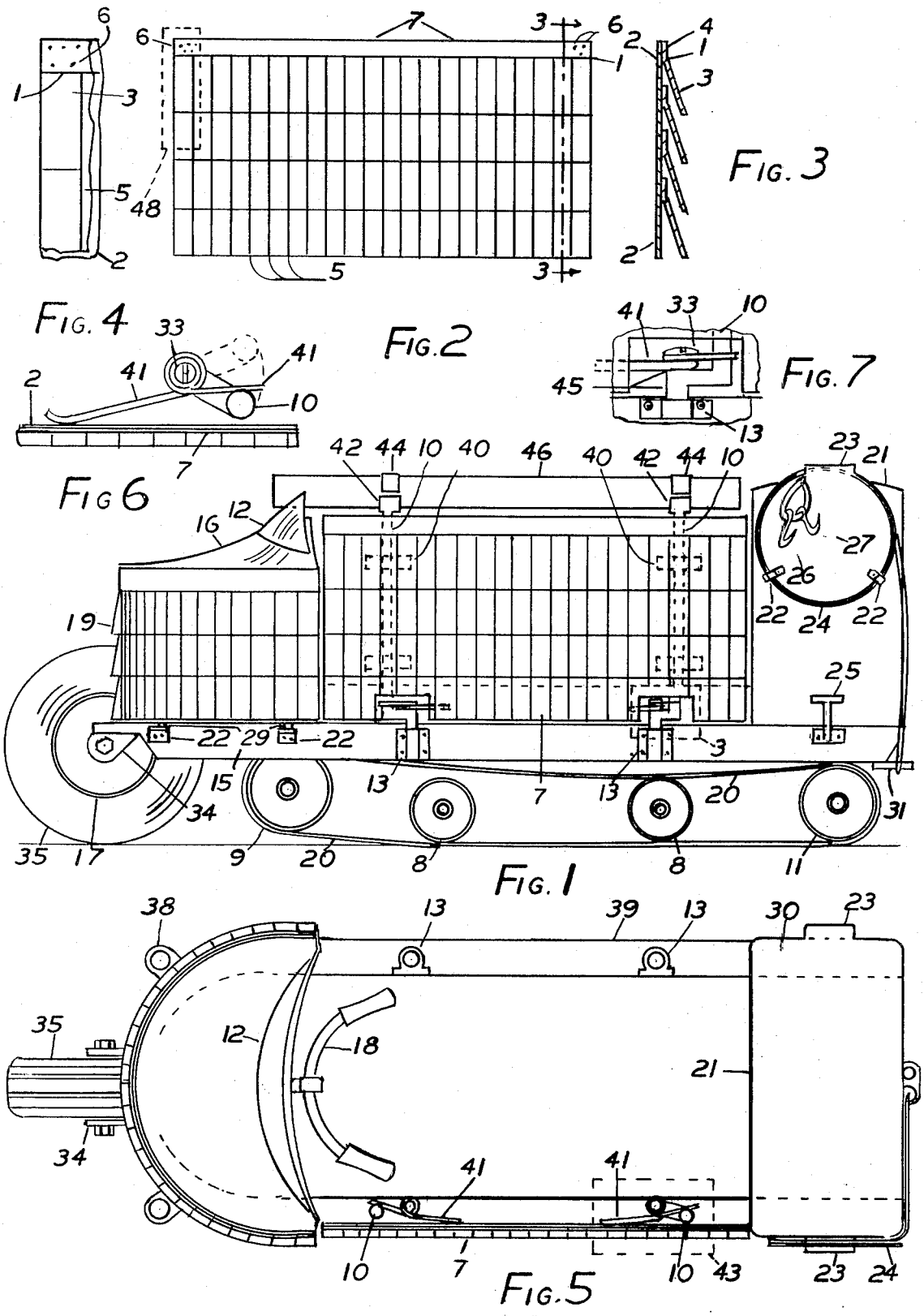

INFANTRY ATTACK VEHICLE WITH RESILIENT ARMOR

BACKGROUND OF THE INVENTION

1. Field of the Invention

This invention relates to infantry attack vehicles as used for invading and attacking the enemy. More specifically it pertains to a vehicle that provides resilient armor protection from enemy fire while attacking, also a means for removing wire entanglement, the ability to attack at a high speed, and to transport casualties in an armored trailer to the first aid station.

2. Prior Arts

The prior patent art is replete with various types of military vehicles and personnel armor protection as set forth in the U.S. Pat. No. 3,710,882 to Marceau; U.S. Pat. No. 3,623,563 to Gostomski; U.S. Pat. No. 2,722,986 to Baldine; U.S. Pat. No. 2,377,838 to Collings; U.S. Pat. No. 2,758,660 to Bouffort; U.S. Pat. No. 1,273,515 to Makrenos; U.S. Pat. No. 936,296 to Bouscal; U.S. Pat. No. 3,649,426 to Gates Jr.; U.S. Pat. No. 2,733,177 to Meyer; U.S. Pat. No. 2,405,590 to Mason; U.S. Pat. No. 3,130,414 to Bailey et al.; U.S. Pat. No. 2,723,214 to Meyer.

SUMMARY OF THE INVENTION

A summary of the application and the advantages are;

1. A vehicle that provides protection to the infantrymen from enemy rifle fire while attacking.

2. A Vehicle that can transport the infantrymen right up to the line of fire at high speed.

3. A vehicle that will deliver the infantrymen to the point of action in a good physical and psychological condition, not exhausted from marching and carrying the heavy military load, or fear of exposure to enemy fire.

4. A vehicle that is small and low to the ground, making it a difficult target.

5. Due to it's high speed it is not only a difficult target, but can also get out of range of fire in a hurry.

6. It's small size permit it to pass through heavy forest, too dense for personal carriers.

7. Because of it's small size it may be concealed in tall grass, brush, etc.

8. If it looses traction it is light enough for the two operators to set it over to firm ground, or it can be towed out by the tow cable of another vehicle.

9. If the resilient armor is hit by a hand grenade, the grenade will rebound away from the vehicle, causing much less damage than a grenade tossed into a fully loaded personal carrier.

10. According to Army records the greatest casualties are suffered when forces are compelled to fight dismounted, while attacking on foot. Since this is true, why not provide the soldiers with a vehicle from which they do not dismount, but kneel or lie prone behind resilient armor that gives them a feeling of security while attacking the enemy.

11. At present the only armor given to the foot soldier is a helmet, (a hold over from the old trench warfare days), while the major part of his body is exposed to enemy fire. Does he not deserve more protection than that? No wonder some of our soldiers in Vietnam refused to go down "Death Alley" when commanded to do so, in this respect the resilient armored vehicle is a moral booster.

12. Since this vehicle has the same conventional type of propulsion as the motor bike and snowmobile, very little training would be required to operate and maintain same.

13. This fast moving attack vehicle, advancing on a wide front would not be susceptible to ambush, but could out-flank and encircle the enemy to prevent his escape.

14. Due to it's large ground contact and light weight it would be well adapted for use in sand and loose soil.

15. It's light weight would permit it to be air-lifted en-mass across rivers by copters or other air craft.

16. Enemy wire entanglement can be removed in short order by means of the entanglement hook and cable.

17. Mined roads or highways may be avoided by traveling across country.

18. These vehicles are very economical and could be refueled by air dropping full plastic jugs of fuel that would serve as gas tanks, thus no time lost to refuel.

19. Due to their light weight these vehicles could be transported en-mass by cargo planes and copters behind enemy lines to launch a very effective surprise attack.

20. The cost per man delivered to the attack area should be less by infantry attack vehicle than by personal carrier, also the soldiers in the personal carrier usualy must dismount and attack on foot against enemy fire.

21. Since the Army has changed to voluntary recruting they have difficulty in securing volinteers for combat duty, providing an armored vehicle for combat will help eliminate this difficulty.

22. And last but not least the employment of large numbers of these vehicles in conjunction with all other military equipment should bring any war to a speedy and successful conclusion.

Aircraft are fine for bombing and destroying, but only the infantry can invade and hold enemy territory to assure a negotiated peace from a position of strength.

BRIEF DISCRIPTION OF THE DRAWINGS

FIG. 1 is a side elevation of the invention.

FIG. 2 is a side elevation of a panel of the resilient armor.

FIG. 3 is a cross sectional view taken in the direction of the arrows along line 3—3 of FIG. 2.

FIG. 4 is an enlarged view of the part of FIG. 2 within the area enclosed by the broken lines 48.

FIG. 5 is a top plan view of the invention showing a panel of resilient armor on the left side of the vehicle and the resilient armor arround the front part of the vehicle.

FIG. 6 is an enlarged top view of the parts enclosed by the dashed lines 43 of FIG. 5.

FIG. 7 is an enlarged side view of the parts enclosed within the dashed lines 37 of FIG. 1.

DESCRIPTION OF THE PREFERRED EMBODIMENTS

Part 7 of FIG. 2 is a complete panel of resilient armor made of special sheet steel and consist of a back plate 2 with several rows of slitted plates 4 spot welded to the back plate 2 as shown at 6, and slit at 5 from it's lower edge up to the bent point 1 in FIGS. 2-4, so the blades 3 stand out at an angle from the back plate 2, forming a row of flat spring type impact blades 3. When these blades are struck by rifle fire they are forced back toward the back plate, thereby taking up the impact without being penetrated and recoil back to their normal position. As shown in FIGS. 1-2 the side panel is made up of several rows of blades 3 and is of sufficient height and length to protect two soldiers.

As shown in FIG. 1 this resilient armor panel 7 is secured at 40 to the two offset uprights 10, the lower end of the uprights may be lifted up out of the sockets 13 and the entire assembly shifted over into similar sockets 13 on the other side of the vehicle, depending on which side is exposed to the enemy fire. As shown in FIGS. 5-6-7 the lower offset end of the uprights 10 are loaded by spring 41 which is coiled around the projection 45 and the retainer screw 33 in FIGS. 6-7, with one end of the spring resting against the inner face of the panel 7 and the other end resting against the inner side of the upright, thereby holding the armor panel outward from the center of the vehicle. If the armor panel 7 is hit by a hand grenade or similar object, it (the panel), is forced inward against the tention of the springs 41, which absorb the shock and cause the grenade to rebound away from the vehicle, and the springs 41 return the armor to the normal position.

The flexable track 20 in FIG. 1, also the engine and transmission (not shown), are of the conventional snowmobile type. Steering is by means of the handle bars 18 and the rubber tired wheel 17-35 in FIGS. 1-5.

The tow cable 24 in FIG. 1 has two hooks, one 27 for towing and the other one 26 which has a hardened accute throat angle and is used to rip away wire entanglement.

A removable supply and ammunition container 21 is secured to the after end of the vehicle by quick action clamps 25 in FIG. 1, and may be lifted off and replaced by a refilled container by means of the handles 23.

The drawbar 31 may also be used as a trailer hitch for transporting trailers, (not shown), of additional supplies, ammunition, personal or for transporting casualties to the first aid. Said trailers being protected by resilient armor.

Two semicircular rocket launcher supports 42 in FIG. 1 are pivot mounted to the top of the uprights 10 and support the launcher 46, which is secured to the supports by elastic straps 44, either one of which may be released and one end of the launcher removed and turned at right angle to the vehicle, with the other end resting in the support while launching rockets.

Two rifles (not shown), may be stowed in elestic straps fastened to the two uprights 10.

While the invention has been described in connection with possible forms or embodiments thereof, it is to be understood that the present disclosure is illustrative rather than restrictive and that further changes or modifications may be resorted to without departing from the spirit of the invention or scope of the claims which follow.

What is claimed is:

1. An infantry attack snowmobile having a propelling motor, transmission and frame comprising:
   a. a rubber tired wheel for stearing said snowmobile;
   b. wrap-around resilient armor for providing shielding for said propelling motor and transmission, said armor comprising a series of outwardly extending flat spring blades, a steel backup plate, means securing said spring blades to said backup plate, and means securing said backup plate to said frame;
   c. a removable panel of resilient armor comprising several rows of outward extending steel spring blades, an inner backup steel plate, said blades being secured to said steel plate by spot welding, and a plurality of uprights secured to said inner backup steel plate for supporting said removable panel, each of said uprights comprising an upper portion, a lower portion and a laterally offset portion connecting said upper and lower portions;
   d. spring means resiliently biasing said latterally offset and upper portions of said uprights latterally outward from said frame;
   e. a plurality of round sockets attached to opposite sides of the frame, said lower portion of said uprights being set into said round sockets on one side of the frame whereby said removable panel may be moved by removing said lower portions of said uprights from the sockets on one side of the frame and placing said lower portions of said uprights into the sockets on the opposite side of the frame;
   f. a plurality semicircular rocket launcher supports, means pivoting each of said rocket launcher supports on the top of each of said upper portions of said uprights, and elastic rocket launcher hold-down straps.

2. An infantry attack snowmobile as in claim 1 further including:
   a. a removable ammunition supplies container, a quick action clamp for securing container to the rear end of said frame;
   b. a towing cable, and means for supporting said cable secured to said ammunition and supplies container.

3. An infantry attack snowmobile as in claim 2, wherein said cable has two hooks, one of said hooks for towing, the other of said hooks having a hardened acute throat angle for gripping and removing wire entanglements.

4. An infantry attack snowmobile as in claim 3 further including:
   a. a tow bar, means securing said towing cable to a hole in said tow bar;
   b. a trailer hitch, and means securing said trailer hitch to an additional hole in said tow bar.

* * * * *